United States Patent

Nobori et al.

[11] Patent Number: 6,077,930
[45] Date of Patent: Jun. 20, 2000

[54] PREPARATION PROCESS OF POLYMER

[75] Inventors: Tadahito Nobori; Shinji Kiyono; Takaomi Hayashi; Usaji Takaki, all of Kanagawa-ken, Japan

[73] Assignee: Mitsui Chemicals, Inc., Japan

[21] Appl. No.: 09/079,230

[22] Filed: May 15, 1998

[30] Foreign Application Priority Data

May 22, 1997 [JP] Japan .................................. 9-132342

[51] Int. Cl.⁷ ........................... C08G 63/08; C08G 63/82
[52] U.S. Cl. ........................ 528/354; 528/355; 528/356; 528/359; 528/363; 528/398; 528/468; 525/88; 525/413; 525/419; 525/420
[58] Field of Search ..................... 528/354, 355, 528/356, 359, 363, 398, 468; 525/88, 413, 419, 420

[56] References Cited

PUBLICATIONS

Chem Abstract 129 : 203429 "Preparation of Siloxane compositions in the presence of phosphazene base activated with water" Remy et al.

*Primary Examiner*—Duc Truong
*Attorney, Agent, or Firm*—Burns, Doane, Swecker & Mathis, L.L.P.

[57] ABSTRACT

A preparation process of a polymer comprising conducting ring-opening polymerization of a 4- to 10-membered ring-opening polymerizable cyclic monomer in the presence of a phosphazenium salt of an active hydrogen compound represented by the chemical formula (1):

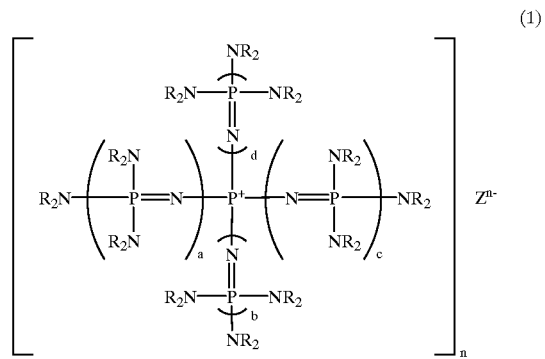

wherein n is an integer of 1 to 8 and indicates the number of phosphazenium cations, $Z^{n-}$ is an anion of a n-valent active hydrogen compound derived by releasing n protons from an active hydrogen compound having a maximum of 8 active hydrogen atoms, a, b, c and d are individually a positive integer or 0 and are not all 0 at the same time, R's are the same or different hydrocarbons having 1 to 10 carbon atoms, and two R's located on each common nitrogen atom may be coupled together to form a ring structure; or in the presence of the phosphazenium salt of the active hydrogen compound and the active hydrogen compound is disclosed. The process can prepare polymer by ring-opening polymerization of a 4- to 10-membered ring-opening polymerizable cyclic monomer in the presence of an initiator which causes no specific problem or preparation and handling, contains quite no installic ingredient and has no residual odor.

31 Claims, No Drawings

PREPARATION PROCESS OF POLYMER

BACKGROUND OF THE INVENTION

1. Field of the Invention

The present invention relates to a preparation process of a polymer by the ring-opening polymerization of a 4- to 10-membered cyclic monomer. Such polymer is important for use in preparation of resin materials and fibers.

2. Related Art of the Invention

An anionic polymerization or a nucleophilic polymerization has been well known as one of the process for conducting ring-opening polymerization of a ring-opening polymerizable cyclic monomer. The polymerization initiators which can be generally used are alkali or alkaline earth metals, compounds thereof, other metallic compounds and amines [T. Saegusa, Ring-opening Polymerization (1), Published from Kagaku Dojin (1971), chapter 2.3.3; Polymer Functional Material Series (2), Synthesis and Reaction of Polymer (2), Edited by Polymer Society of Japan, Published from Kyoritsu Shuppan Co. (1991), chapter 1.2].

However, in some cases, physical properties and thermal stability of the polymer obtained by using the initiators which contain these metals are remarkably damaged by residual metallic ingredients. Consequently, the preparation process of these polymers requires a specific method or a complex step for sufficiently removing these metallic ingredients. On the other hand, amine initiators, which are of non-metal, have still problems on insufficient polymerization activity and residual amine odor.

Further, polymerization of a lactam or a cyclic siloxane performed in the presence of a non-metallic phosphazene compound has been known [U.S. Pat. No. 5,399,662; Macromol. Rapid Commun., 16, 449–453 (1995); Macromol. Symp., 107, 331–340 (1996)]. The phosphazene compound has a strongly basic property and can be an effective initiator in these processes. However, a complex process is required for preparing the phosphazene compound. Furthermore, on the preparation of the phosphazene compound, more strongly basic compound such as sodium amide must be used in order to provide strongly basic property to the phosphazene compound. Those matters are quite unfavorable in industry. Moreover, on handling the phosphazene compound, the deterioration by carbon dioxide in the air often arises due to strongly basic property of the phosphazene compound.

SUMMARY OF THE INVENTION

The object of the invention is to provide a process for efficiently preparing a polymer by using an initiator which causes no specific problem on preparation or handling and contains quite no metallic ingredient and residual odor, in the preparation of a polymer by conducting ring-opening polymerization of a 4- to 10-membered ring-opening polymerizable cyclic monomer.

As a result of an intensive investigation in order to achieve the above object, the present inventors have found that a 4- to 10-membered ring-opening polymerizable cyclic monomer can be very effectively ring-opening polymerized in the presence of a phosphazenium salt of an active hydrogen compound or in the presence of the phosphazenium salt of the active hydrogen compound and the active hydrogen compound. Thus, the present invention has been completed.

That is, one aspect of the invention is a preparation process of a polymer comprising conducting ring-opening polymerization of a 4- to 10-membered ring-opening polymerizable cyclic monomer in the presence of a phosphazenium salt of an active hydrogen compound represented by the chemical formula (1):

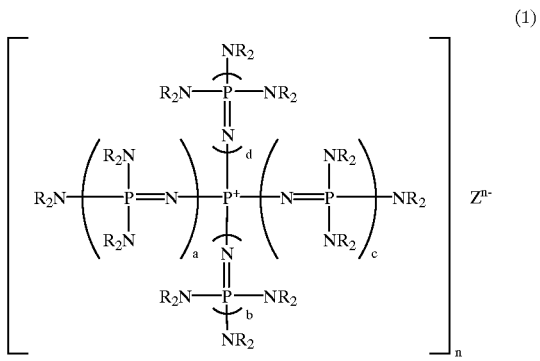

wherein n is an integer of 1 to 8 and indicates the number of phosphazenium cations, $Z^{n-}$ is an anion of a n-valent active hydrogen compound derived by releasing n protons from an active hydrogen compound having a maximum of 8 active hydrogen atoms, a, b, c and d are individually a positive integer of 3 or less or 0 and are not all 0 at the same time, R's are the same or different hydrocarbons having 1 to 10 carbon atoms, and two R's located on each common nitrogen atom may be coupled together to form a ring structure; or in the presence of the phosphazenium salt of the active hydrogen compound and the active hydrogen compound.

The phosphazenium cation of the phosphazenium salt of the active hydrogen compound represented by the chemical formula (1) in the invention is indicated by the limiting structure in which the positive charge is localized on the central phosphorus atom. However, other numerous limiting structures can be present and practically the charge is delocalized over the whole molecule.

The process of the invention can prepare polymer by ring-opening polymerization of a 4- to 10-membered ring-opening polymerizable cyclic monomer in the presence of an initiator which causes no specific problem on preparation and handling, contains no metallic ingredient at all and has no residual odor.

DESCRIPTION OF THE PREFERRED EMBODIMENT

The term "a 4- to 10-membered ring-opening polymerizable cyclic monomer" in the process of the invention is referred to as 4- to 10-membered lactones, lactams, lactides (cyclic diner of α-hydroxycarboxylic acid), cyclic carbonates, α-amino acid N-carboxyanhydrides, cyclic phosphates, cyclic phosphonates and cyclic siloxanes. Polycyclic compounds having other ring structure can also be used so long as the ring-opening polymerizable group has a 4- to 10-membered ring.

Specific cyclic monomers include, for example, lactones, such as β-propiolactone, δ-valerolactone, δ-caprolactone, 1,4-dioxan-2-one, ε-caprolactone, 6,8-dioxabicyclo[3.2.1]octan-7-one and 2-oxabicyclo[2.2.2]octan-3-one; lactams, such as β-propiolactam, γ-butyrolactam, δ-valerolactam, ε-caprolactam, 2-azabicyclo[2.2.1]heptan-3-one and 8-oxa-6-azabicyclo[3.2.1]octan-7-one; lactides, such as glycolide and lactide; cyclic carbonates, such as ethylene carbonate and 5,5-dimethyl-1,3-dioxan-2-one; α-amino acid-N-carboxyanhydrides, such as L-alanine N-carboxyanhydride, DL-2-amino stearic acid N-carboxyanhydride and γ-benzyl L-glutamate N-carboxyanhydride; cyclic phosphates, such as 2-ethoxy-2-oxo-1,3,2-dioxaphosphorane and 2-methoxy-2-oxo-1,3,2-dioxaphosphorinane; cyclic phosphonates, such as 2-methyl-2-oxo-1,3,2-dioxaphosphorane and 2-ethyl-2-oxo-1,3,2-dioxaphosphorinane; and cyclic siloxane, such as hexamethylcyclotrisilo xane and octamethylcyclotetrasiloxane. Any other 4- to 10-membered cyclic compounds can also be used so long as the compounds can progress ring-opening polymerization in the process of the invention.

The cyclic compounds which can be preferably used are lactones, such as propiolactone, δ-valerolactone, δ-caprolactone, 1,4-dioxan-2-one, γ-caprolactone, 6,8-dioxabicyclo[3.2.1]octan-7-one and 2-oxabicyclo[2.2.2]octan-3-one; lactides, such as glycolide and lactide; cyclic carbonates, such as ethylene carbonate and 5,5-dimethyl-1,3-dioxan-2-one; α-amino acid N-carboxyanhydrides, such as L-alanine N-carboxyanhydride, DL-2-amino stearic acid N-carboxyanhydride and γ-benzyl L-glutamate N-carboxyanhydride; and cyclic siloxanes, such as hexamethylcyclotrisiloxane and octamethylcyclotetrasiloxane. Further, lactones and lactides are more preferably used in these compounds.

These 4- to 10-membered ring-opening polymerizable cyclic monomers can be used in combination with another ring-opening polymerizable monomer. Subsequently, a copolymer can be prepared by using two or more 4- to 10-membered ring opening poymerizable cyclic monomers in combination. Further, another copolymer can be prepared by using at least a 4- to 10-membered ring-opening polymerizable cyclic monomer and an alkylene oxide compound in combination.

Exemplary alkylene oxide compounds which can be used in combination include, for example, ethylene oxide, propylene oxide, 1,2-butylene oxide, 2,3-butylene oxide, styrene oxide, cyclohexene oxide, epichlorohydrin, epibromohydrin, methyl glycidyl ether, allyl glycidyl ether, phenyl glycidyl ether and other epoxy compounds. Among these compounds, ethylene oxide, propylene oxide, 1,2-butylene oxide, and styrene oxide are preferably used, propylene oxide and ethylene oxide are more preferably used, and propylene oxide is most preferably used.

When used in combination, two or more 4- to 10-membered ring-opening polymerizable cyclic monomers or single or plural 4- to 10-membered ring-opening polymerizable cyclic monomer(s) and single or plural alkylene oxide(s) can be combined. A method for using simultaneously, a method for using sucsseively, or method for using successively and repeatedly can be employed.

When polymerization is carried out by using two and more monomers simultaneously, a copolymer having relatively high randomness can be obtained although the randomness varies depending upon the difference in reactivity of these monomers. When two and more monomers are polymerized successively, a block copolymer including two and more blocks can be obtained. More complex block copolymers can be obtained by repeating such successive combination.

Particularly, a block copolymer can be preferably prepared by successively using at least a 4- to 10-membered ring-opening polymerizable cyclic monomer and an alkylene oxide compound. The alkylene oxide compound for use in such a copolymer is preferably propylene oxide and ethylene oxide, more preferably propylene oxide.

The symbols a, b, c and d in the phosphazenium salt of the active hydrogen compound represented by the chemical formula (1) in the invention are individually a positive integer of 3 or less or 0 and are not all 0 at the same time. Preferably, they are individually a positive integer of 2 or less or 0, more preferably values of the combination selected from (2,1,1,1), (1,1,1,1), (0,1,1,1), (0,0,1,1) and (0,0,0,1) irrespective of the order of a, b, c and d, most preferably values of the combination selected from (1,1,1,1), (0,1,1,1) and (0,0,1,1).

R's in the phosphazenium salt of active hydrogen compound represented by the chemical formula (1) in the invention are the same or different aliphatic or aromatic hydrocarbon groups having 1 to 10 carbon atoms. R is specifically selected from the aliphatic and aromatic hydrocarbon groups, for example, methyl, ethyl, n-propyl, isopropyl, allyl, n-butyl, sec-butyl, tert-butyl, 2-butenyl, 1-pentyl, 2-pentyl, 3-pentyl, 2-methyl-1-butyl, isopentyl, tert-pentyl, 3-methyl-2-butyl, neopentyl, n-hexyl, 4-methyl-2-pentyl, cyclopentyl, cyclohexyl, 1-heptyl, 3-heptyl, 1-octyl, 2-octyl, 2-ethyl-1-hexyl, 1,1-dimethyl-3,3-dimethylbutyl (a common name: tert-octyl), nonyl, decyl, phenyl, 4-tolyl, benzyl, 1-phenylethyl and 2-phenylethyl. Among these groups, aliphatic hydrocarbon groups having 1 to 10 carbon atoms, such as methyl, ethyl, n-propyl, isopropyl, tert-butyl, tert-pentyl and 1,1-dimethyl-3,3-dimethylbutyl are preferably used; aliphatic hydrocarbon groups of 1 to 3 carbon atoms, such as methyl, ethyl, n-propyl and isopropyl are more preferably used; methyl and ethyl groups are most preferably used.

R's located on each common nitrogen atom in the phosphazenium salt of the active hydrogen compound represented by the chemical formula (1) can be coupled together to form a ring structure; and the resultant cyclic amino group including the nitrogen atom is a cyclic secondary amino group. The cyclic secondary amino group can comprise preferably of 4 to 6 carbon atoms in the ring, consequently being 5 to 7 membered ring.

Exemplary cyclic secondary amino groups include, for example, pyrrolidin-1-yl, piperidin-1-yl, morpholin-4-yl groups and methyl- or ethyl-substituted those groups. Among them, unsubstituted pyrrolidin-1-yl, piperidin-1-yl and morpholin-4-yl groups are preferably used. A portion or the whole of nitrogen atoms in the phosphazenium salt of active hydrogen compound represented by the chemical formula (1) can form such cyclic structure.

The active hydrogen compound providing $Z^{n-}$ (that is an anion of n-valent active hydrogen compound) in the phosphazenium salt of active hydrogen compound represented by the chemical formula (1) in the invention, or the active hydrogen compound existing in the ring-opening polymerization conducted in the presence of the phosphazenium salt of active hydrogen compound and the active hydrogen compound is an organic compound which has 8 active hydrogen atoms at a maximum and includes an active hydrogen compound having an active hydrogen atom on an oxygen atom or a nitrogen atom.

Representative active hydrogen compounds having an active hydrogen atom on an oxygen atom include, for example, water; carboxylic acids having 1 to 20 carbon atoms, such as formic acid, acetic acid, propionic acid, butyric aicd, isobutyric acid, caproic acid, lauric acid, stearic acid, oleic aicd, phenylacetic acid, dihydrocinnamic acid, cyclohexanecarboxylic acid, benzoic acid, p-methyl benzoic acid and naphthalene-2-carboxylic acid; polycarboxylic acids having 2 to 20 carbon atoms and 2 to 6 carboxyl groups, such as oxalic acid, malonic acid, succinic aicd, maleic acid, fumaric acid, adipic acid, itaconic acid, butanetetracarboxylic acid, phthalic acid, isophthalic acid, terephthalic acid, trimellitic acid and pyromellitic acid; carbamic acids, such as N,N-diethylcarbamic acid, pyrrolidone-N-carboxylic acid, aniline-N-carboxylic acid and 2,4-toluenediamino-N,N'-dicarboxylic acid alcohols having 1 to 20 carbon atoms, such as methanol, ethanol, n-propanol, isopropanol, n-butyl alcohol, sec-butyl alcohol, tert-butyl alcohol, isopentyl alcohol, tert-pentyl alcohol, n-octy alcohol, lauryl alcohol, cetyl alcohol, cyclopentyl alcohol, cyclohexyl alcohol, allyl alcohol, crotyl alcohol, methyl vinyl carbinol, benzyl alcohol, 1-phenylethyl alcohol, triphenyl carbinol and cinnamyl alcohol; polyhydric alcohols having 2 to 20 carbon atoms and 2 to 8 hydroxyl groups, such as ethylene glycol, propylene glycol, diethylene glycol, dipropylene glycol, 1,3-propanediol, 1,3-butanediol, 1,4-butanediol, 1,6-hexanediol, 1,4-cyclohexanediol, trimethylolpropane, glycerol, diglycerol, pentaerythritol and dipentaerythritol; saccharides and derivatives thereof, such as glucose, sorbitol, dextrose, fructose and sucrose; and aromatic hydroxy compounds having 6 to 20 carbon atoms and 1 to 3 hydroxyl groups, such as phenol, cresol, xylenol, anisole, 2-naphthol, naphthalene-2,6-diol and bisphenol-A.

Exemplary active hydrogen compounds having an active hydrogen atom on a nitrogen atom include, for example, aliphatic or aromatic primary amines having 1 to 20 carbon atoms, such as methylamine, ethylamine, n-propylamine, isopropylamine, n-butylamine, isobutylamine, sec-butylamine, tert-butylamine, cyclohexylamine, benzylamine, β-phenyl-ethylamine, aniline, o-toluidine, m-toluidine and p-toluidine; aliphatic or aromatic secondary amines having 2 to 20 carbon atoms, such as dimethylamine, methylethylamine, diethylamine, di-n-propylamine, ethyl-n-butylamine, methyl-sec-butylamine, dipentylamine, dicyclohexylamine, N-methylaniline and diphenylamine; polyamines having 2 to 20 carbon atoms and 2 to 3 primary or secondary amino groups, such as ethylenediamine, di(2-aminoethyl)amine, hexamethylenediamine, 4,4'-diaminodiphenylmethane, tri(2-aminoethyl) amine, N,N'-dimethylethylenediamine, N,N'-diethylethylenediamine and di(2-methylaminoethyl)amine; saturated cyclic secondary amines having 4 to 20 carbon atoms, such as pyrrolidine, piperidine, morpholine and 1,2,3,4-tetrahydroquinoline; unsaturated cyclic secondary amines having 4 to 20 carbon atoms, such as 3-pyrroline, pyrrole, indole, carbozole, imidazole, pyrazole and purine; cyclic polyamines having 4 to 20 carbon atoms and 2 to 3 secondary amino groups, such as piperazine, pyrazine and 1,4,7-triazacyclononane; unsubstituted or N-monosubstituted acid amides having 2 to 20 carbon atoms, such as acetamide, propionamide, N-methylpropionamide, N-methylbenzoylamide and N-ethylstearylamide; 4 to 7 membered cyclic amides, such as β-propiolactam, 2-pyrrolidone, δ-valerolactam and ε-caprolactam; and dicarboxylic acid imides having 4 to 10 carbon atoms, such as succinimide, maleimide and phthalimide.

Further active hydrogen compounds which can be used in the invention include polymers having terminal active hydrogen atoms selected from poly(alkylene oxide)s, such as poly(ethylene oxide)s, and poly(propylene oxide)s, polyesters, polyamides, polylactides, polycarbonates, polypeptides, poly(phosphoric ester)s, and polysiloxanes which can be prepared by ring-opening polymerization or other processes from alkylene oxides, lactones, lactams, lactides, cyclic carbonates, α-amino acid-N-carboxyanhydrides, cyclic phosphates, cyclic phosphonates and cyclic siloxanes, and copolymers thereof.

The above-mentioned active hydrogen compounds include compounds having two or more active hydrogen atoms. These active hydrogen atoms can be eliminated either entirely or only in part to derive to anions to form a phosphazenium salt. In the latter case, some active hydrogen atoms remain in the compound. However, due to quickly attained equilibrium, polymerization can initiate from all positions of the active hydrogen atoms in the compound, and even from any positions of the active hydrogen atoms in the active hydrogen compound which co-exists in the system without forming the phosphazenium salt at all.

The symbol n in the phosphazenium salt of active hydrogen compound represented by the chemical formula (1) is an integer of 1 to 8, preferably an integer of 1 to 3.

In the invention, the active hydrogen compounds which provides $Z^{n-}$ (that is, n-valent anion of the active hydrogen compound) in a phosphazenium salt represented by the chemical formula (1), can be the same with or can differ from an active hydrogen compound which exists in the ring-opening polymerization conducted in the presence of a phosphazenium salt of active hydrogen compound and an active hydrogen compound. Furthermore, the active hydrogen compound can be used singly or simultaneously used as a mixture.

Representative active hydrogen compounds which can be preferably used include, for example, water; carboxylic acids having 1 to 6 carbon atoms, such as formic acid, acetic acid, propionic acid, butyric acid, isobutyric acid and caproic acid; alcohols having 1 to 10 carbon atoms, such as methanol, ethanol, n-propanol, isopropanol, n-butyl alcohol, sec-butyl alcohol, tert-butyl alcohol, isopentyl alcohol, tert-pentyl alcohol and n-octyl alcohol; polyhydric alcohols having 2 to 10 carbon atoms and 2 to 4 hydroxyl groups, such as ethylene glycol, diethylene glycol, propylene glycol, 1,4-butanediol, trimethylolpropane, glycerol and pentaerythritol; aromatic hydroxy compounds having 6 to 8 carbon atoms, such as phenol, cresol, xylenol and anisole; polyamines having 2 to 10 carbon atoms and 2 to 3 secondary amino groups, such as N,N'-dimethylethylenediamine, N,N'-diethylethylenediamine and di(2-methylaminoethyl) amine; saturated cyclic secondary amines having 4 to 10 carbon atoms, such as pyrrolidine, piperidine, morpholine and 1,2,3,4-tetrahydroquinoline; cyclic polyamines having 4 to 10 carbon atoms and 2 to 3 secondary amino groups, such as piperazine, pyrazine and 1,4,7-triazacyclononane; 4 to 7 membered cyclic amides, such as β-propiolactam, 2-pyrrolidone, δ-valerolactam and ε-caprolactam; and polymers having terminal active hydrogen atoms selected from poly(alkylene oxide)s, such as poly(ethylene oxide)s, and poly(propylene oxide)s, polyesters, polyamides, polylactides, polypeptides and polysiloxanes, and copolymer thereof.

The phosphazenium salt of active hydrogen compound represented by the chemical formula (1) in the invention can be prepared, for example, by the below described processes.

① One equivalent of phosphorus pentachloride is reacted with 3 equivalents of disubstituted amine $R_2NH$ and further reacted with 1 equivalent of ammonia, and successively the product is treated with a base to obtain 2,2,2-tris(disubstituted amino)-2$\lambda^5$-phosphazene represented by the chemical formula (2)

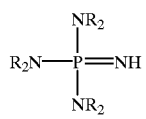

② The phosphazene compound represented by the chemical formula (2) is reacted with bis(disubstituted amino)phosphorochloridate {(R₂N)₂P(O)Cl} to give bis(disubstituted amino)[tris(disubstituted amino) phosphoranylideneamino]phosphine oxide. The resulting phosphine oxide is chlorinated with phosphorus oxychloride and successively reacted with ammonia and thereafter treated with a base to prepare 2,2,4,4,4-pentakis(disubstituted amino)-$2\lambda^5,4\lambda^5$-phosphazene represented by the chemical formula (3):

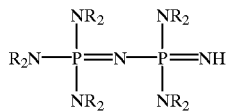

③ The phosphazene compound represented by the chemical formula (3) is used in place of the phosphazene compound used in ② which is represented by the chemical formula (2) and reacted by the same procedures as ② to obtain oligophosphazene having q=3 in the compounds represented by the chemical formula (4):

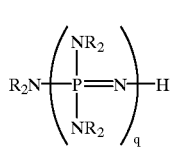

wherein q is 0 and an integer of 1 to 3, q=0 indicates disubstituted amine, q=1 indicates a compound of the chemical formula (2), q=2 indicates a compound of the chemical formula (3), and q=3 indicates oligophosphazene obtained in ③.

④ Phosphazenium chloride which corresponds to n=1 and $Z^{n-}=Cl^-$ in the chemical formula (1) can be obtained by successively reacting phosphorus pentachloride with 4 equivalents of the compounds which differ in q and/or R in the chemical formula (4) or by simultaneously reacting phosphorus pentachloride with 4 equivalents of the compounds having the same q and R in the chemical formula (4).

⑤ In order to replace the chloro anion of phosphazenium chloride by the anion of the desired active hydrogen compound, phosphazenium chloride is treated with an alkali or alkaline earth metal salt of corresponding active hydrogen compound. Alternatively, when the active hydrogen compound is water, that is, n=1 and $Z^{n-}=OH^-$, hydroxyl group type ion exchange resin can be applied. The phosphazenium salt of common active hydrogen compound represented by the chemical formula (1) can generally be thus obtained.

Further, the phosphazenium salt of other species of active hydrogen compound can also be obtained in some cases, for example, by reacting other species of active hydrogen compound with phosphazenium salts, such as phosphazenium hydroxide or phosphazenium methoxide.

In the invention, a 4- to 10-membered ring-opening polymerizable cyclic monomer is polymerized in the presence of the phosphazenium salt of active hydrogen compound represented by the above chemical formula (1) or in the presence of the phosphazenium salt of said active hydrogen compound and an active hydrogen compound. The amount of the phosphazenium salt of active hydrogen compound for use in the polymerization process is usually in the range of $1\times10^{-10}$ to $3\times10^{-1}$ mole, preferably $1\times10^{-7}$ to $1\times10^{-1}$ mole per mole of said cyclic monomer.

Further, when the ring-opening polymerization is carried out in the presence of the phosphazenium salt of the active hydrogen compound and an active hydrogen compound, the amount of coexisting active hydrogen compound is usually in the range of greater than 0 to $1\times10^6$ moles or less, preferably $1\times10^1$ to $1\times10^4$ moles per mole of the phosphazenium salt of active hydrogen compound.

No particular restriction is imposed upon the form of ring-opening polymerization reaction in the process of the invention so long as the 4- to 10-membered ring-opening polymerizable cyclic monomer can be effectively brought into contact with the phosphazenium salt of the active hydrogen compound, and also with an active hydrogen compound, when used, and further with an alkylene oxide compound, when used in combination. A batch process which charges these materials at one time with a solvent, when used, or a process for continuously or intermittently feeding the raw materials can be carried out. The temperature of ring-opening polymerization reaction differs depending upon the species of the monomer, species and amount of the phosphazenium salt of active hydrogen compound and species and amount of an active hydrogen compound, when coexisted. The temperature is usually in the range of 0 to 300° C., preferably 20 to 250 ° C.

The pressure of ring-opening polymerization reaction is usually 3.0 MPa (absolute pressure, this will apply equally hereinafter) or less, preferably 0.01 to 1.5 MPa, more preferably 0.1 to 1.0 MPa.

The reaction time of ring-opening polymerization differs depending upon the species of monomer, species and amount of the phosphazenium salt of the active hydrogen compound and an active hydrogen compound, when existed, and reaction temperature. The reaction time is usually 100 hours or less, preferably 0.1 to 50 hours.

The ring-opening polymerization in the process of the invention can be carried out in the molten state of the monomer and a suitable solvent can also be used, when necessary.

The polymer thus obtained can be applied as intact for uses as a raw material simply by removing the solvent, when it is used. In other cases, the resulting polymer can be treated with acid to substitute the residual phosphazenium cation at the polymer terminal for proton and the resulting phosphazenium salt can be removed by adsorption or by washing with a common solvent.

The invention will be hereinafter illustrated further in detail. However, it is to be understood that the invention is not limited to the specific embodiments and the illustration is included merely to aid in understanding the invention.

EXAMPLE 1

To a 100 ml reaction vessel, 17.1 g (150 m.mol) of ε-caprolactone and 301 mg (0.390 m.mol) of the phosphazenium salt of active hydrogen compound, tetrakis[tris (dimethylamino)phosphoranylideneamino]phosphonium methoxide $\{[(Me_2N)_3P=N]_4P^+,MeO^-\}$ were charged. The mixture was heated in a nitrogen atmosphere with stirring at 180° C. to carry out polymerization for 10 hours. The liquid obtained had a high viscosity and solidified when cooled to the room temperature. According to gas chromatographic analysis, $\epsilon$-caprolactone was completely consumed. Polymer thus obtained was 17.4 g. The polymer had a number average molecular weight of 9700 by gel permeation chromatography using poly(ethylene oxide) as a reference.

Comparative Example 1

The same procedures as Example 1 were carried out except that tetrakis[tris(dimethylamino) phosphoranylideneamino]phosphonium methoxide $\{[(Me_2N)_3P=N]_4P^+,MeO^-\}$ was not used. According to the gas chromatographic analysis, $\epsilon$-caprolactone was almost theoretically recovered and polymerization reaction was not found.

EXAMPLES 2~4

Monomers and phosphazenium salts of active hydrogen compounds were used as shown in Table 1. The molar amount of these raw materials were the same as used in Example 1. The reaction was carried out for the time shown in Table 1. Other procedures were the same as carried out in Example 1. Results are illustrated in Table 1.

EXAMPLE 5

In a reaction vessel connected with a vacuum line, 100 ml of a solution of 44.5 g (150 m.mol) of octamethylcyclotetrasiloxane in toluene was prepared and cooled to 10° C. To the solution, 301 mg (0.390 m.mol) of tetrakis[tris (dimethylamino)phosphoranylideneamino]pho sphonium methoxide $\{[(Me_2N)_3P=N]_4P^+,MeO^-\}$ was added and stirred for several minutes. After adding a small amount of chlorotrimethylsilane, the reaction mixture was concentrated to some extent and poured into 300 ml of methanol. The resulting precipitate was filtered and dried under reduced pressure. The polymer thus obtained was 25.3 g, and had a number average molecular weight of 98300.

EXAMPLE 6

To a 100 ml reaction vessel, 15.3 g (150 m.mol) of 1,3-dioxane-2-one and 300 mg (0.389 m.mol) of tetrakis[tris (dimethylamino) phosphoranylideneamino]phosphonium methoxide $\{[(Me_2N)_3P=N]_4P^+,MeO^-\}$ were charged and heated to 160° C. with stirring in a nitrogen atmosphere, and polymerized for 10 hours. Slightly foaming was observed in the course of the reaction. Polymer thus obtained was 13.1 g and had a number average molecular weight of 3510.

EXAMPLE 7

To a 100 ml reaction vessel, 17.3 g (150 m.mol) of alanine-N-carboxylic anhydride and 312 mg (0.391 m.mol) of tetrakis[tris(dimethyl amino)phosphoranylideneamino] phosphonium isopropoxide $\{[(Me_2N)_3P=N]_4P^+, (CH_3)_2CHO^-\}$ were charged and heated to 160° C. with stirring in a nitrogen atmosphere and polymerized for 10 hours. Polymer thus obtained was 10.1 g and had a number average molecular weight of 3720.

EXAMPLE 8

Ethylene glycol was heat-dehydrated with tetrakis[tris (dimethylamino)phosphoranylideneamino]phosphonium hydroxide $\{[(Me_2N)_3P=N]_4P^+,OH^-\}$ in a molar ratio of 1:0.008 and used as an initiator. Propylene oxide was polymerized and polymer having a number average molecular weight of 783 and a hydroxyl value of 143 (mg KOH/g polymer) was prepared. From the resultant poly(propylene oxide) on which catalyst removal or any other post-treatment was not made, 7.83 g (10.0 m.mol) of intact polymer was taken out for further polymerization. In this portion of the polymer, there should be 0.08 m.mol of terminal ~O⁻ (phosphazenium)⁺ groups among entire terminal ~OH groups.

To 7.83 g of the polymer, 14.4 g (100 m.mol) of lactide was added and polymerized at 180° C. for 10 hours. Viscosity was gradually increased and a highly viscous product being scarcely flowable at room temperature was obtained. Lactide was completely consumed and the product had a number average molecular weight of 2185.

The polymer thus obtained is a blockcopolymer of poly (lactide)·poly (propyleneoxide)·poly(lactide) type.

EXAMPLE 9

To a reaction vessel connected with a vacuum line, a solution obtained by dissolving 7.05 g (9.11 m.mol) of tetrakis[tris(dimethylamino)phosphoranylideneamino] phosphonium chloride $\{[(Me_2N)_3P=N]_4P^+,Cl^-\}$ in 100 g of tetrahydrofuran (hereinafter referred to simply as THF) was charged. To another reaction vessel connected with a vacuum line, a solution of 1.03 g (9.10 m.mol) of $\epsilon$-caprolactam in 30 ml of THF was charged. To the latter solution, 10 ml of 1.0 N n-butyl lithium solution in n-hexane was added by using a syringe under ice-water cooling and stirred for 30 minutes. Thereafter, the whole amount of the lithium salt of caprolactam was added with a syringe to the above phosphazenium chloride solution. The mixture was stirred at room temperature for an hour and successively concentrated under reduced pressure to about 30 ml. To the resulting concentrate, about 30 ml of n-heptane was added and stirred. Lithium chloride was separated in the form of white precipitate. The precipitate was removed by passing through a glass filter. The filtrate was concentrated to 50 ml under reduced pressure.

The solution of the phosphazenium salt of $\epsilon$-caplolactam was thus prepared.

On the other hand, 11.3 g (100 m.mol) of $\epsilon$-caprolactam was charged to a reactor under nitrogen atmosphere and 5.0 ml (0.91 m.mol) of the above obtained phosphazenium salt solution of $\epsilon$-caprolactam was added. The solvent was distilled off by gradually raising the temperature and finally polymerization was carried out at 180° C. for 5 hours. The polymer obtained was solid at room temperature and had a number average molecular weight of 9526.

EXAMPLE 10

A mixture of 0.912 g (5.00 m.mol) of dipotassium salt of diethylene glycol and 50 g of diethylene glycol dimethyl ether was prepared. To the mixture, 7.91 g (10.2 m.mol) of tetrakis[tris(dimethylamino) phosphoranylideneamino] phosphonium chloride $\{[(Me_2N)_3P=N]_4P^+,Cl^-\}$ was added and heated to 80° C. with stirring for 3 hours. Thereafter, the mixture was concentrated to dryness under reduced pressure. To the solid thus obtained, 30 ml of THF was added and stirred at 60° C. for 2 hours. Insoluble matter was filtered and the filtrate was evaporated to dryness under reduced pressure. Thus, diphosphazenium salt of diethylene glycol, a compound having n=2 in the chemical formula (1), that is, bis {tetrakis[tris(dimethylamino)

phosphoranylideneamino]phospho nium} salt of diethylene glycol was obtained as solid. The yield was 7.70 g.

After adding 0.317 g (0.200 m.mol) of the diphosphazenium salt to 17.1 g (150 m.mol) of ε-caprolactone, polymerization was carried out at 180° C. for 5 hours in a nitrogen atmosphere. Polymer obtained was solid at room temperature and had a number average molecular weight of 10500.

EXAMPLE 11

To a 100 ml reaction vessel, 22.8 g (200 m.mol) of ε-caprolactone, 295 mg (0.390 m.mol) of a phosphazenium salt of an active hydrogen compound, that is, tetrakis[tris(dimethylamino)phosphoranylideneamino]phosphonium hydroxide {[(Me$_2$N)$_3$P=N]$_4$P$^+$,OH$^-$} and 70.2 mg (3.90 m.mol) of water as an active hydrogen compound were charged and polymerized for 5 hours by heating at 180° C. with stirring in a nitrogen atmosphere.

The reaction mixture obtained was liquid having high viscosity, and solidified at room temperature. According to the gas chromatographic analysis, ε-caprolactone was completely consumed. Polymer obtained was 23.1 g, and had a number average molecular weight of 5200 by gel permeation chromatography using poly(ethylene oxide) as the reference.

EXAMPLES 12~19

The same procedures as described in Example 11 were carried out except that phosphazenium salts of active hydrogen compounds and coexisting active hydrogen compound were used as shown in Table 2 and the amount of these compounds were respectively the same molar amount as used in Example 11. Results are illustrated in Table 2.

EXAMPLE 20

To a 300 ml pressure reaction vessel, 3.11 g (50.1 m.mol) of ethylene glycol and 151 mg (0.200 m.mol) of tetrakis[tris(dimethylamino)phosphoranylideneamino]phosphonium hydroxide {[(Me$_2$N)$_3$P=N]$_4$P$^+$,OH$^-$} were charged and dehydrated by heating at 120° C. in a nitrogen stream. After cooling, 115 g (1.01 mol) of ε-caprolactone was added and polymerized for 20 hours by heating to 180° C. in a nitrogen atmosphere.(the first step). After cooling, a very small amount of the reaction mixture was discharged and subjected to gas chromatography. According to the analysis, ε-caprolactone was completely consumed. Poly(ε-caprolactone) thus obtained had a number average molecular weight of 2320 by gel permeation chromatography using poly(ethylene glycol) as a reference.

To the reaction mixture in the pressure reaction vessel, 72.1 g (500 m.mol) of lactide was further added and heated again to 180° C. Polymerization was carried out at the temperature for 12 hours.(the second step). After cooling, the pressure reaction vessel was released and 187 g of the polymer was obtained. The polymer had a number average molecular weight of 3520 by gel permeation chromatography.

The polymer thus obtained is a block copolymer of poly(lactide). poly(ε-caprolactone)·poly(lactide) type.

EXAMPLE 21

Poly(ε-caprolactone) was prepared by carrying out the same procedures as the first step in Example 20. In the second step of Example 20, lactide was replaced by 58.1 g(1.00 m.mol) of propylene oxide. The reaction mixture was gradually heated to 80° C. and polymerized at the temperature for 10 hours. The maximum reaction pressure was 0.4 MPa. Nitrogen was vented to release the residual pressure. After cooling, 173 g of the polymer was obtained. The polymer is a block copolymer of poly(propylene oxide)·poly(ε-caprolactone)·poly(propylene oxide) type and had a number average molecular weight of 3410 by gel permeation chromatography.

EXAMPLE 22

The same procedures as described in the first step of Example 20 were carried out except that ε-caprolactone was replaced by 58.1 g (1.00 mol) of propylene oxide and polymerization was carried out at 80° C. for 10 hours. Maximum reaction pressure was 0.4 MPa. After cooling, 114.1 g (1.00 mol) of ε-caprolactone was additionally charged to the pressure reaction vessel and polymerization was carried out at 180° C. for 20 hours. Polymer thus obtained was 170 g. The polymer is a block copolymer of poly(ε-caprolactone)·poly(propylene oxide)·poly(ε-caprolactone) type and had a number average molecular weight of 3480 by gel permeation chromatography.

Any polymer obtained in these examples had no specific older.

TABLE 1

| Example | Cyclic monomer | Phosphazenium salt of active hydrogen | Polymerization time (Hr) | Yield of Polymer (g) | Number average molecular weight |
|---|---|---|---|---|---|
| 1 | ε-Caprolactone | [(Me$_2$N)$_3$P=N]$_4$P$^+$,MeO$^-$ | 10 | 17.4 | 9700 |
| 2 | δ-Valerolactone | [(Me$_2$N)$_3$P=N]$_4$P$^+$,OH$^-$ | 5 | 15.3 | 5800 |
| 3 | Lactide | [(Me$_2$N)$_3$P=N]$_4$P$^+$,EtO$^-$ | 5 | 21.8 | 3300 |
| 4 | Glycolide | [(Me$_2$N)$_3$P=N]$_4$P$^+$,CH$_3$COO$^-$ | 5 | 17.5 | 2900 | note:
Me . . . methyl group
Et . . . ethyl group

TABLE 2

| Example | Phosphazenium salt of active hydrogen compound | Coexisting active hydrogen compound | Number average molecular weight |
|---|---|---|---|
| 11 | [(Me$_2$N)$_3$P=N]$_4$P$^+$, OH$^-$ | water | 5200 |
| 12 | [(Me$_2$N)$_3$P=N]$_4$P$^+$[N(n-Octyl)Me], MeO$^-$ | trimethylolpropane | 1800 |

TABLE 2-continued

| Example | Phosphazenium salt of active hydrogen compound | Coexisting active hydrogen compound | Number average molecular weight |
|---|---|---|---|
| 13 | [(O⌬N)$_3$P=N]$_3$P$^+$(NEt$_2$), PhO$^-$ | phenol | 5400 |
| 14 | [(O⌬N)$_3$P=N]$_2$P$^+$(NMe$_2$)$_2$, MeO$^-$ | glycerol | 1700 |
| 15 | [(Me$_2$N)$_3$P=N]$_4$P$^+$, MeO$^-$ | n-octyl alcohol | 5500 |
| 16 | [(Me$_2$N)$_3$P=N]$_4$P$^+$, MeO$^-$ | N,N'-dimethylethylenediamine | 2800 |
| 17 | [(Me$_2$N)$_3$P=N]$_4$P$^+$, MeO$^-$ | piperidine | 6700 |
| 18 | [(Me$_2$N)$_3$P=N]$_4$P$^+$, MeO$^-$ | piperazine | 4500 |
| 19 | [(Me$_2$N)$_3$P=N]$_4$P$^+$, MeO$^-$ | polyglycolic acid (M$_n$ 2300) | 7800 | note:
Me . . . methyl group
n-Oct . . . n-octyl group
Et . . . ethyl group
Ph . . . phenyl group

What is claimed is:

1. A preparation process of a polymer comprising conducting ring-opening polymerization of a 4- to 10-membered ring-opening polymerizable cyclic monomer in the presence of a phosphazenium salt of an active hydrogen compound represented by the chemical formula (1):

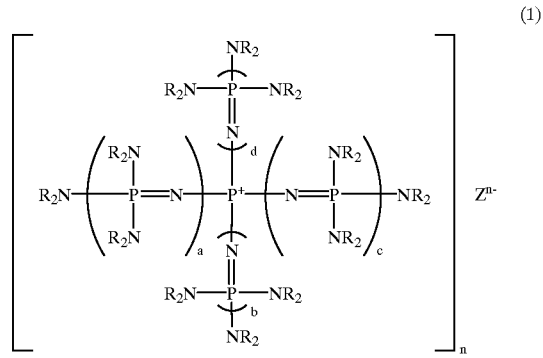

(1)

wherein n is an integer of 1 to 8 and indicates the number of phosphazenium cations, $Z^{n-}$ is an anion of a n-valent active hydrogen compound derived by releasing n protons from an active hydrogen compound having a maximum of 8 active hydrogen atoms, a, b, c and d are individually a positive integer of 3 or less or 0 and are not all 0 at the same time, R's are the same or different hydrocarbons having 1 to 10 carbon atoms, and two R's located on each common nitrogen atom may be coupled together to form a ring structure; or in the presence of the phosphazenium salt of the active hydrogen compound and the active hydrogen compound.

2. A process according to claim 1, wherein the 4- to 10-membered ring-opening polymerizable cyclic monomer is selected from the group consisting of lactones, lactides, cyclic carbonates, α-amino acid N-carboxyanhydides and cyclic siloxanes.

3. A process according to claim 1, wherein the 4- to 10-membered ring-opening polymerizable cyclic monomer is selected from lactones and lactides.

4. A process according to claim 3, wherein n in the phosphazenium salt of the active hydrogen compound represented by the chemical formula (1) is an integer of 1 to 3.

5. A process according to one of claim 4, wherein a, b, c and d in the phosphazenium salt of the active hydrogen compound represented by the chemical formula (1) are individually an integer of 2 or less or 0.

6. A process according to claim 4, wherein a, b, c and d in the phosphazenium salt of the active hydrogen compound represented by the chemical formula (1) are, irrespective of the order of a, b, c and d, a values of a combination selected from (1,1,1,1), (0,1,1,1) or (0,0,1,1).

7. A process according to claim 6, wherein R's in the phosphazenium salt of the active hydrogen compound represented by the chemical formula (1) are the same or different aliphatic hydrocarbon groups having 1 to 10 carbon atoms.

8. A process according to claim 6, wherein R's in the phosphazenium salt of the active hydrogen compound are the same or different aliphatic hydrocarbon groups having 1 to 3 carbon atoms.

9. A process according to claim 8, wherein R's located on each common nitrogen atom in the phosphazenium salt of the active hydrogen compound represented by the chemical formula (1) are coupled together to form a ring structure; and the resultant cyclic amino group including the nitrogen atom is a cyclic secondary amino group having 4 to 6 carbon atoms in the ring.

10. A process according to claim 8, wherein R's located on each common nitrogen atom in the phosphazenium salt of the active hydrogen compound represented by the chemical formula (1) are coupled together to form a ring structure; and the resultant cyclic amino group including the nitrogen atom is pyrrolidin-1-yl group, piperidin-1-yl group or morpholin-4-yl group.

11. A process according to claim 10, wherein the active hydrogen compound providing $Z^{n-}$ in the phosphazenium salt of the active hydrogen compound represented by the chemical formula (1) or the active hydrogen compound existing in the ring-opening polymerization conducted in the presence of the phosphazenium salt of the active hydrogen compound and the active hydrogen compound is an active hydrogen compound selected from the group consisting of water, carboxylic acids having 1 to 6 carbon atoms, alcohols having 1 to 10 carbon atoms, polyhydric alcohol having 2 to 10 carbon atoms and 2 to 4 hydroxyl groups, aromatic hydroxy compounds having 6 to 8 carbon atoms, polyamines having 2 to 10 carbon atoms and 2 to 3 secondary amino groups, saturated cyclic secondary amines having 4 to 10 carbon atoms, cyclic polyamines having 4 to 10 carbon atoms and 2 to 3 secondary amino groups, cyclic amides having a 4- to 7- membered ring, polymer having terminal active hydrogen atoms selected from poly(alkylene oxides), polyesters, polyamides, polylactides, polypeptides and polysiloxanes and copolymer thereof.

12. A process according to claim 11, wherein the polymer is a copolymer and is prepared by using two or more 4- to 10-membered ring-opening polymerizable cyclic monomers.

13. A process according to claim 11, wherein the polymer is a copolymer and is prepared by using at least a 4- to 10-membered ring-opening polymerization cyclic monomer and an alkylene oxide compound.

14. A process according to claim 11, wherein the polymer is a copolymer and is prepared by using at least a 4- to 10-membered ring-opening polymerizable cyclic monomer and propylene oxide or ethylene oxide.

15. A process according to claim 11, wherein the polymer is a block copolymer and is prepared by successively using at least a 4- to 10-membered ring-opening polymerizable cyclic monomer and an alkylene oxide compound.

16. A process according to claim 15, wherein the amount of phosphazenium salt of the active hydrogen compound is $1 \times 10^{-7}$ to $1 \times 10^{-1}$ mole per mole of the 4- to 10-membered ring-opening polymerizable cyclic monomer.

17. A process according to claim 16, wherein the amount of the active hydrogen compound is $1 \times 10^{1}$ to $1 \times 10^{4}$ moles per mole of the phosphazenium salt of the active hydrogen compound when the ring-opening polymerization is conducted in the presence of the phosphazenium salt of the active hydrogen compound and the active hydrogen compound.

18. A process according to claim 1, wherein n in the phosphazenium salt of the active hydrogen compound represented by the chemical formula (1) is an integer of 1 to 3.

19. A process according to claim 1, wherein a, b, c and d in the phosphazenium salt of the active hydrogen compound represented by the chemical formula (1) are individually an integer of 2 or less or 0.

20. A process according to claim 1, wherein a, b, c and d in the phosphazenium salt of the active hydrogen compound represented by the chemical formula (1) are, irrespective of the order of a, b, c and d, a values of a combination selected from (1,1,1,1), (0,1,1,1) or (0,0,1,1).

21. A process according to claim 1, wherein R's in the phosphazenium salt of the active hydrogen compound represented by the chemical formula (1) are the same or different aliphatic hydrocarbon groups having 1 to 10 carbon atoms.

22. A process according to claim 1, wherein R's in the phosphazenium salt of the active hydrogen compound are the same or different aliphatic hydrocarbon groups having 1 to 3 carbon atoms.

23. A process according to claim 1, wherein R's located on each common nitrogen atom in the phosphazenium salt of the active hydrogen compound represented by the chemical formula (1) are coupled together to form a ring structure; and the resultant cyclic amino group including the nitrogen atom is a cyclic secondary amino group having 4 to 6 carbon atoms in the ring.

24. A process according to claim 1, wherein R's located on each common nitrogen atom in the phosphazenium salt of the active hydrogen compound represented by the chemical formula (1) are coupled together to form a ring structure; and the resultant cyclic amino group including the nitrogen atom is pyrrolidin-1-yl group, piperidin-1-yl group or morpholin-4-yl group.

25. A process according to claim 1, wherein the active hydrogen compound providing $Z^{n-}$ in the phosphazenium salt of the active hydrogen compound represented by the chemical formula (1) or the active hydrogen compound existing in the ring-opening polymerization conducted in the presence of the phosphazenium salt of the active hydrogen compound and the active hydrogen compound is an active hydrogen compound selected from the group consisting of water, carboxylic acids having 1 to 6 carbon atoms, alcohols having 1 to 10 carbon atoms, polyhydric alcohol having 2 to 10 carbon atoms and 2 to 4 hydroxyl groups, aromatic hydroxy compounds having 6 to 8 carbon atoms, polyamines having 2 to 10 carbon atoms and 2 to 3 secondary amino groups, saturated cyclic secondary amines having 4 to 10 carbon atoms, cyclic polyamines having 4 to 10 carbon atoms and 2 to 3 secondary amino groups, cyclic amides having a 4- to 7- membered ring, polymer having terminal active hydrogen atoms selected from poly(alkylene oxides), polyesters, polyamides, polylactides, polypeptides and polysiloxanes and copolymer thereof.

26. A process according to claim 1, wherein the polymer is a copolymer and is prepared by using two or more 4- to 10-membered ring-opening polymerizable cyclic monomers.

27. A process according to claim 1, wherein the polymer is a copolymer and is prepared by using at least a 4- to 10-membered ring-opening polymerization cyclic monomer and an alkylene oxide compound.

28. A process according to claim 1, wherein the polymer is a copolymer and is prepared by using at least a 4- to 10-membered ring-opening polymerizable cyclic monomer and propylene oxide or ethylene oxide.

29. A process according to claim 1, wherein the polymer is a block copolymer and is prepared by successively using at least a 4- to 10-membered ring-opening polymerizable cyclic monomer and an alkylene oxide compound.

30. A process according to claim 1, wherein the amount of phosphazenium salt of the active hydrogen compound is $1 \times 10^{-7}$ to $1 \times 10^{-1}$ mole per mole of the 4- to 10-membered ring-opening polymerizable cyclic monomer.

31. A process according to claim 1, wherein the amount of the active hydrogen compound is $1 \times 10^{1}$ to $1 \times 10^{4}$ moles per mole of the phosphazenium salt of the active hydrogen compound when the ring-opening polymerization is conducted in the presence of the phosphazenium salt of the active hydrogen compound and the active hydrogen compound.

* * * * *